US012010988B1

(12) United States Patent
Rao et al.

(10) Patent No.: US 12,010,988 B1
(45) Date of Patent: Jun. 18, 2024

(54) LOW-TEMPERATURE SEMEN CRYOPRESERVATION DEVICE

(71) Applicant: Zhejiang University, Hangzhou (CN)

(72) Inventors: Jin-peng Rao, Hangzhou (CN); Shen Tian, Hangzhou (CN); Min Jin, Hangzhou (CN); Chun Feng, Hangzhou (CN); Fan Jin, Hangzhou (CN); Jian Chen, Hangzhou (CN); Feng Qiu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/489,969

(22) Filed: Oct. 19, 2023

(30) Foreign Application Priority Data

Dec. 28, 2022 (CN) .......................... 202223525674.2

(51) Int. Cl.
*A01N 1/02* (2006.01)

(52) U.S. Cl.
CPC ......... *A01N 1/0263* (2013.01); *A01N 1/0221* (2013.01)

(58) Field of Classification Search
CPC ............................ A01N 1/0263; A01N 1/0221
See application file for complete search history.

(56) References Cited

U.S. PATENT DOCUMENTS

| | | | | |
|---|---|---|---|---|
| 2003/0084680 A1* | 5/2003 | Douglas-Hamilton | ... | F25D 3/08 62/457.2 |
| 2005/0276728 A1* | 12/2005 | Muller-Cohn | ...... | B01L 3/50255 422/400 |
| 2006/0053825 A1* | 3/2006 | Owen | .................. | A01N 1/0257 62/371 |
| 2009/0305224 A1* | 12/2009 | He | ........................ | A01N 1/0278 435/2 |
| 2010/0275636 A1* | 11/2010 | Yoshimura | ........... | A01N 1/0263 901/30 |
| 2011/0308271 A1* | 12/2011 | Schryver | .............. | A01N 1/0263 62/465 |
| 2012/0052485 A1* | 3/2012 | Shany | ................ | A61B 10/0096 435/5 |
| 2012/0272500 A1* | 11/2012 | Reuteler | .............. | A01N 1/0263 414/277 |
| 2014/0171829 A1* | 6/2014 | Holmes | ............ | A61B 5/150343 600/575 |

(Continued)

*Primary Examiner* — Jonathan M Hurst
(74) *Attorney, Agent, or Firm* — Zhigang Ma

(57) ABSTRACT

This invention provides a low-temperature semen cryopreservation device, comprising: a box body for containing low-temperature cryoprotectant fluid; a tray, one end of which is pivotally connected to the inner side wall of the box body, and a limiting portion is provided on the tray for limiting the movement of the cryoprotectant tube. Two openings are sequentially arranged along the height direction on one side of the box body relative to the hinge end, with the height of one opening higher than that of the hinge end, and the height of the other opening lower than that of the hinge end; a limiting plate, which can be detachably inserted into either opening. When the limiting plate is switched from one opening to the other, the tray tilts to drive the cryopreservation tube to rotate 180 degrees, thereby ensuring the low-temperature cryoprotectant fluid to evenly fumigate the cryopreservation tube, improving the pre-cooling effect.

10 Claims, 3 Drawing Sheets

(56) References Cited

U.S. PATENT DOCUMENTS

| | | | |
|---|---|---|---|
| 2014/0230472 A1* | 8/2014 | Coradetti | F25D 29/00 |
| | | | 62/125 |
| 2015/0024487 A1* | 1/2015 | Cheng | A01N 1/0268 |
| | | | 435/307.1 |
| 2016/0175837 A1* | 6/2016 | Chaffey | A01N 1/0268 |
| | | | 422/565 |
| 2017/0252745 A1* | 9/2017 | Xu | B01L 3/523 |
| 2018/0055042 A1* | 3/2018 | Sarmentero Ortiz | |
| | | | A01N 1/0268 |
| 2018/0135806 A1* | 5/2018 | Qu | F17C 7/02 |
| 2019/0297877 A1* | 10/2019 | Komatsu | A01N 1/0268 |
| 2020/0107541 A1* | 4/2020 | Blair | B01L 3/5082 |
| 2021/0401410 A1* | 12/2021 | Prien | C08K 5/521 |

* cited by examiner

LOW-TEMPERATURE SEMEN CRYOPRESERVATION DEVICE

TECHNICAL FIELD

This invention relates to the field of assisted reproductive technology, particularly to a low-temperature semen cryopreservation device.

BACKGROUND

There are three main methods in the term of semen cryopreservation: programmed freezing, vitrification freezing and liquid nitrogen vapor fumigation freezing. Programmed Freezing: This method requires the purchase of expensive programmed freezing equipment, and the process is slow, with no significant improvement in freezing results compared to the other two methods, currently it is less widely used in clinic. Vitrification Freezing: Vitrification freezing is a "fast freezing" method, which involves directly inserting a mixture of semen and cryoprotectant into liquid nitrogen, and can be used for rare sperm samples cryopreservation (small liquid volume, less susceptible to crystallization). However, crystallization is quite often when using large-volume cryopreservation tubes, leading to poor freezing results. Liquid Nitrogen Vapor Fumigation Freezing: This method takes advantage of the low temperature provided by the evaporation of liquid nitrogen to pre-cool semen samples before immersing them in liquid nitrogen. It helps sperm get through the critical period of ice crystal formation in a very brief period. This method is even more convenient and time-saving than vitrification, which is why it is adopted by more and more reproductive centers.

The current practice of liquid nitrogen vapor fumigation freezing often involves clamping cylindrical storage tubes containing semen samples and freezing fluid into aluminum racks and placing the aluminum racks over the liquid nitrogen for fumigation. This method is simple and feasible, but it also has some drawbacks: First, the vapor fumigation only contacts with the down side of storage tube, and the other side facing upwards does not contact with enough fumigation, resulting in insufficient and uneven pre-cooling. Also, there is a risk that the tubes may not be securely clamped in the rack, potentially leading to insufficient pre-cooling effect and unexpected overturn of the tubes into liquid nitrogen.

Therefore, the current liquid nitrogen vapor fumigation freezing method has the following technical problems: it results in uneven contact of fumigation and risks of overturn for the cryopreservation tubes, leading to suboptimal pre-cooling effects.

SUMMARY

This patent application describes a low-temperature semen cryopreservation device to address technical issues in existing technology related to uneven vaporization and detachment of semen storage tubes from aluminum frames in liquid nitrogen, leading to poor pre-cooling effects and the risk of falling into the liquid nitrogen. To resolve these issues, the application proposes a low-temperature semen cryopreservation device for freezing semen storage tubes, comprising:

A box for holding low-temperature freezing liquid.

A tray, one side of which is pivotally connected to the inner wall of the box. The tray is used for holding the semen storage tubes and has limiting parts to restrict the movement of the tubes. Two openings are arranged on one side of the box relative to the pivot end. One of the openings is higher than the pivot end, and the other is lower.

A limiting plate that can be removably inserted into either of the two openings. When the limiting plate is inserted into one of the openings, the limiting parts can engage with the side of the tray opposite the pivot end. When the limiting plate is switched from one opening to the other, it tilts the tray to rotate the semen storage tubes until they abut against the limiting parts.

Furthermore, the tray is in a grid-like pattern.

Furthermore, the box also has marking lines for observing the liquid level.

Furthermore, multiple limiting parts are arrayed on the tray, allowing one semen storage tube to be placed between adjacent limiting parts.

Furthermore, the limiting parts are strip-shaped protrusions on the tray.

Furthermore, the spacing between adjacent limiting parts is equal to half the circumference of the semen storage tube.

Furthermore, the limiting plate has an "L" shape.

Furthermore, the limiting plate has two parts corresponding to the two openings.

Furthermore, the device also includes a cover that can form a closed chamber with the box.

Furthermore, the inner wall and bottom end surface of the box are covered with low thermal conductivity material.

One or more technical solutions provided in the present implementation example have at least the following technical effects or advantages:

1. By setting a tray to place cryogenic tubes, it can prevent the tubes from overturn and falling. Compared to the commonly used aluminum frame clasp, it effectively avoids the risk of cryogenic tubes prematurely falling into liquid nitrogen due to insufficient clamping at the clasp. In addition, one end of the tray is hinged to the inner wall of the box body, and the other end is engaged with a limiting plate. By setting openings of different heights, the limiting plate is inserted and matched with different openings, making a height difference for the tray corresponding to different openings. This allows the cryogenic tubes on the tray to rotate by gravity to complete rolling and flipping, and a limiting part is provided to limit the movement of the cryogenic tubes, effectively fumigating the other side of the cryogenic tubes. This enhances the uniformity of fumigation of the cryogenic tubes and improves the pre-cooling effect. It effectively addresses technical problems in the existing art, where liquid nitrogen vapor fumigation and freezing can lead to uneven fumigation of cryogenic tubes and easy detachment from the aluminum frame, resulting in inadequate pre-cooling effects and the risk of falling into liquid nitrogen.

2. As liquid nitrogen evaporates, the level of liquid nitrogen decreases, increasing the its distance from the cryogenic tubes, which would affect the cooling efficiency. The semen cryopreservation device proposed in the present implementation example includes a tilting limiting plate, which can drive the tray to move gradually downward within the liquid nitrogen level, ensuring that the tray matches the descending liquid nitrogen level. Currently, the embryologists have to lower the height of the aluminum frame manually or to continue to add liquid nitrogen to the box, which can lead to boiling of the liquid nitrogen and significant temperature fluctuations. Adding liquid nitrogen also increases its consumption and requires careful control of the pouring quantity, resulting in inconvenience during the process. Our invention proposed in this application ensures the pre-cooling effect of liquid nitrogen on the cryogenic tubes, effectively solves the technical problem in the existing art where it is difficult to synchronize the downward movement of cryogenic tubes with the decreasing liquid nitrogen level using conventional aluminum frame clamps.

3. Multiple limiting parts are arranged in an array on the tray, and between adjacent limiting parts, a cryogenic vial can be placed, allowing multiple cryogenic tubes to be frozen simultaneously. This enhances the efficiency of a single freezing process, effectively addressing the technical problem in existing technology where aluminum bars generally freeze only 1-2 semen tubes at a time, resulting in lower freezing efficiency.

4. Marking lines for observing the liquid level height are placed on the inner wall of the box body, facilitating the observation of the relative distance between the liquid nitrogen level and the cryogenic tubes for the operators.

5. Low thermal conductivity materials are adhered to the inner wall and bottom end surface of the box body, and a sealing cover is placed on the box body. This prevents the outward evaporation of liquid nitrogen and blocks unnecessary heat exchange between the freezing box and the external environment. Compared to the open foam freezing boxes in existing technology, it slows down the evaporation of liquid nitrogen, effectively saving the usage of liquid nitrogen and ensuring the freezing effect.

6. The tray is designed in a grid pattern to allow upward steam fumigation of liquid nitrogen, and it is made of silver alloy material or pure silver material for good thermal conductivity and freezing effect.

7. The edges of the tray are equipped with protective flanges to prevent semen cryogenic tubes from detaching from the sides and falling into the liquid nitrogen.

8. The spacing between adjacent limiting parts is equal to the outer diameter of the cryogenic vial plus half of its circumference. This ensures that when the initial position of the cryogenic vial rotates to engage with adjacent limiting parts, it rotates exactly 180 degrees to complete the flipping process, thereby effectively fumigating the other side of the tube and improving the freezing effect.

9. Both the first and second openings are flat-shaped, facilitating the insertion of the limiting plate and maximizing the overlap area between the limiting plate and the tray for a more stable fit.

10. Both the first and second openings are centrally positioned relative to the box body to ensure uniform force distribution on the tray.

BRIEF DESCRIPTION OF DRAWINGS

In order to explain the embodiments of the invention or the technical scheme in the prior art more clearly, the drawings needed in the description of the embodiments or the prior art will be briefly introduced below. Obviously, the drawings in the following description are only some embodiments of the invention. For ordinary technicians in the field, other drawings can be obtained according to these drawings without creative work.

DETAILED DESCRIPTION OF EMBODIMENTS

In one or more embodiments of this application, a low-temperature semen freezing and storage device is provided to address technical issues in existing technology where the vapor fumigation freezing method using liquid nitrogen results in uneven fumigation of cryogenic tubes and the risk of them easily detaching from aluminum frames, leading to inadequate pre-cooling and the possibility of falling into liquid nitrogen.

The technical solution in this application is as follows: By using a tray to place cryogenic tubes, it prevents the tubes from falling. This is more effective compared to the commonly used aluminum frame clasp, which avoids the risk of tubes prematurely falling into liquid nitrogen due to insufficient clamping at the clasp. Furthermore, one end of the tray is hinged to the inner wall of the box body, and the other end is connected to a limiting plate. By setting openings of different heights and inserting the limiting plate into different openings, a height difference is created for the tray corresponding to different openings. This allows the cryogenic tubes on the tray to rotate by gravity, completing the rolling and flipping process. A limiting part is also set to limit the movement of the cryogenic tubes, effectively fumigating the other side of the tubes. This improves the uniformity of fumigation and improves the pre-cooling effect, effectively solving the technical problem in existing technology where the vapor fumigation freezing method using liquid nitrogen results in uneven fumigation of cryogenic tubes and their easy detachment from aluminum frames, leading to inadequate pre-cooling effects and the risk of falling into liquid nitrogen.

To better understand this technical solution, it will be explained in detail in the following sections with the help of the accompanying drawings and specific embodiments.

One or more embodiments of this application provide a low-temperature semen freezing and storage device for placing cryogenic tubes and freezing them. These cryogenic tubes are used for freezing and storing semen, but in other embodiments, the device can also be used for freezing and storing other items.

Figure 1:
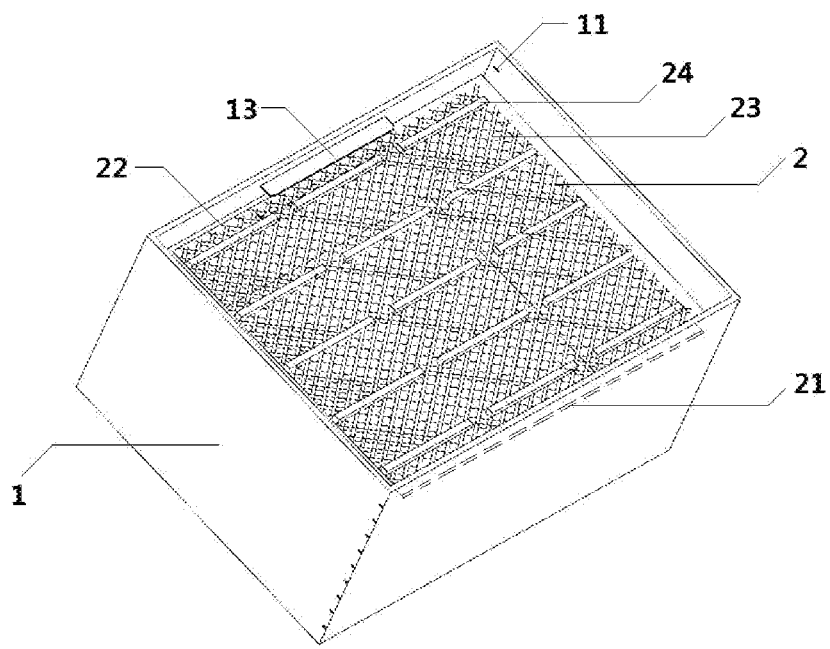
FIG. 1 is a schematic diagram of the cooperation between a box body and a tray in an embodiment of the invention.
Figure 2:
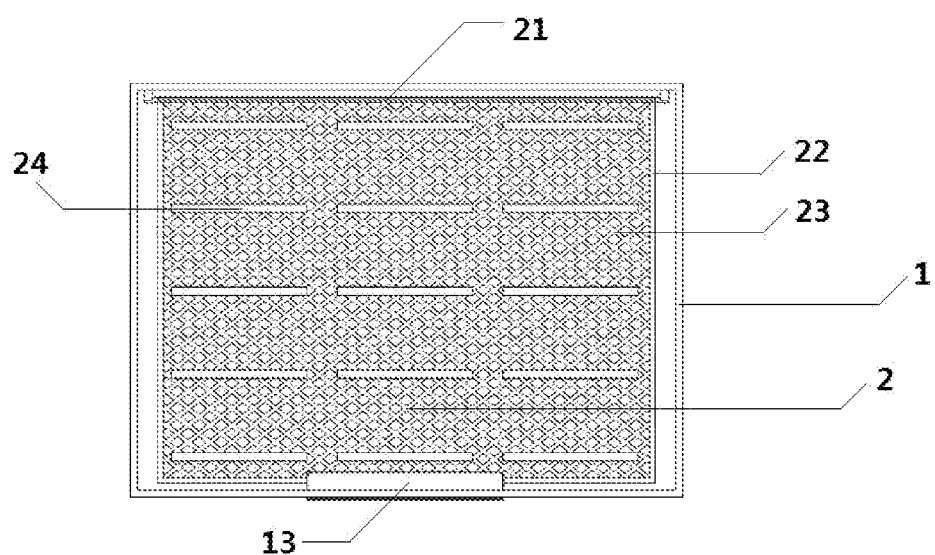
FIG. 2 is a top view of FIG. 1.

As shown in FIGS. 1 and 2, one or more embodiments of this application provide a low-temperature semen freezing and storage device for placing cryogenic tubes and freezing them. The device includes:

A box body (1) for containing low-temperature freezing liquid.

A tray (2) whose one side is hinged to the inner wall of the box body (1). The tray (2) is used for holding cryogenic tubes and has limiting parts (24) for limiting the movement of the cryogenic tubes. On one side of the box body (1), relative to the hinged end (21), two openings are arranged in the vertical direction, where the height of one of the openings is higher than that of the hinged end (21) while the height of the other opening is lower.

A limiting plate (13) that can be detachably inserted into either of the openings. When the limiting plate (13) is inserted into one of the openings, the limiting parts (24) can engage with the side of the tray (2) opposite to the hinged end (21).

When the limiting plate (13) is switched from one opening to the other, it tilts the tray (2), causing the cryogenic tubes to rotate until they contact the limiting parts (24).

It should be noted that in the embodiments of this application, low-temperature freezing liquid can be liquid nitrogen, and the hinged end (21) refers to the end where the tray (2) is hinged to the inner wall of the box body (1).

The low-temperature semen freezing and storage device provided by this invention is designed to address the technical issues in existing technology where the vapor fumigation freezing method using liquid nitrogen results in uneven fumigation of cryogenic tubes and the risk of them easily detaching from aluminum frames, leading to inadequate pre-cooling effects and the possibility of falling into liquid nitrogen.

In some embodiments, this invention provides a device for placing cryogenic tubes and preventing them from falling by using a tray (2). This is more effective compared to the commonly used aluminum frame clasp, which avoids the risk of tubes prematurely falling into liquid nitrogen due to insufficient clamping at the clasp. Additionally, one end of the tray (2) is hinged to the inner wall of the box body (1), and the other end is connected to a limiting plate (13). By setting openings of different heights and inserting the limiting plate (13) into different openings, a height difference is created for the tray (2) corresponding to different openings. This allows the cryogenic tubes on the tray (2) to rotate by gravity, completing the rolling and flipping process. A limiting part (24) is also set to limit the movement of the cryogenic tubes, effectively fumigating the other side of the tubes. This improves the uniformity of fumigation and enhances the pre-cooling effect, effectively solving the technical problem in existing technology where the vapor fumigation freezing method using liquid nitrogen results in uneven fumigation of cryogenic tubes and their easy detachment from aluminum frames, leading to inadequate pre-cooling effects and the risk of falling into liquid nitrogen.

Figure 3:
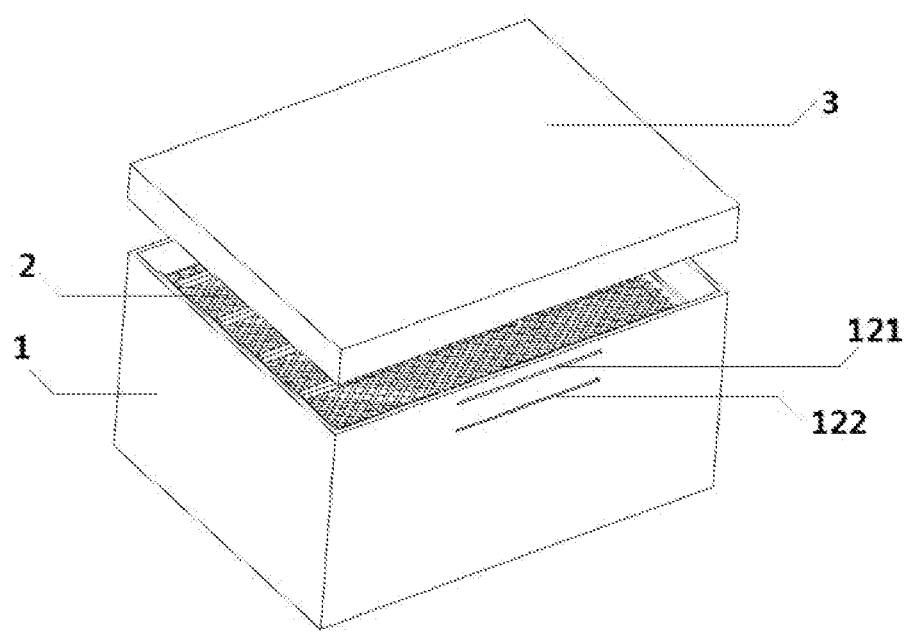
FIG. 3 is a schematic diagram of the cooperation between the box body and the cover body in the embodiment of the invention.

In some embodiments, as shown in FIGS. 1 to 3, the inner wall of the box body (1) is provided with marking lines (11) for observing the liquid level height. These marking lines (11) facilitate more precise control of the relative distance between the liquid nitrogen level and the cryogenic tubes by the operators, allowing them to take appropriate actions (e.g., adding liquid nitrogen) as the liquid nitrogen level decreases.

In some embodiments, as shown in FIG. 2, the inner wall and bottom end surface of the box body (1) are covered with low thermal conductivity materials, and a cover (3) is placed on the box body (1). The cover (3) can form a closed cavity with the box body (1). For example, the cover (3) can be made of glass material. This configuration prevents the outward evaporation of liquid nitrogen and blocks unnecessary heat exchange between the freezing box and the external environment. It also allows the operators to observe the contents inside the box more easily. Low thermal conductivity materials can be made of polyurethane with a low thermal conductivity coefficient (<0.02 W/(m·K)). The combination of low thermal conductivity polyurethane (inner layer) and the glass cover is more effective in slowing down the evaporation of liquid nitrogen compared to open foam freezing boxes in existing technology, effectively saving the usage of liquid nitrogen and ensuring the freezing effect.

In some embodiments, as shown in FIG. 2, the tray (2) is designed in a grid pattern, and it is made of high thermal conductivity material interwoven with silver wires (23). Preferably, silver alloy material or pure silver material is used. Silver has a thermal conductivity coefficient of 429 W/(m·K), which is better than aluminum (thermal conductivity coefficient of 237 W/(m·K)). The edges of the tray (2) have vertical protective flanges (22) facing upwards. This configuration prevents cryogenic tubes from detaching and falling into the liquid nitrogen.

Furthermore, in some embodiments, the spacing between adjacent silver wires (23) on the grid-shaped tray (2) is 0.5 cm. This allows upward steam fumigation of liquid nitrogen while ensuring that the cryogenic tubes do not fall into the liquid nitrogen due to excessive gaps. In this case, the spacing between adjacent silver wires (23) on the tray (2) just needs to be smaller than the diameter of the cryogenic tubes.

As shown in FIG. 2, in some embodiments, the tray (2) is arranged with multiple limiting parts (24), and one cryogenic vial can be placed between adjacent limiting parts (24). Specifically, the limiting parts (24) can be supported by silver materials and are strip-shaped protrusions set on the tray (2). For example, the tray (2) is equipped with 15 limiting parts (24) arranged in 5 columns and 3 rows, allowing one cryogenic vial to be placed between adjacent limiting parts (24). In total, this device can simultaneously freeze 12 cryogenic tubes. In contrast, existing technology typically only allows the freezing of 1-2 semen tubes at a time using aluminum bars, resulting in lower efficiency.

In some embodiments, the spacing between adjacent limiting parts (24) is equal to the outer diameter of the cryogenic tubes plus half of their circumference. For example, for commonly used cryogenic tubes with an outer diameter (d) of approximately 1.2 cm, the spacing (L) between adjacent limiting parts (24) would be approximately $L=1/2\pi d+d\approx 3.1$ cm. This means that when the initial position of the cryogenic vial rotates to abut the adjacent limiting part (24), it will complete a 180° rotation, effectively flipping the cryogenic vial and ensuring efficient fumigation. The spacing between the limiting parts (24) can be adjusted according to the actual dimensions of the cryogenic tubes.

In some embodiments, among the two openings mentioned earlier, one opening's horizontal height is higher than the setting of the hinge end (21), and the other opening's height is lower than the setting of the hinge end (21). For descriptive purposes, the opening located above is referred to as the first opening (121), and the one located below is referred to as the second opening (122). Both the first opening (121) and the second opening (122) are designed to be flat openings, which facilitate the insertion of the limiting plate (13) and maximize the overlap area between the limiting plate (13) and the tray (2), ensuring stable placement of the tray (2). Preferably, the first opening (121) and the second opening (122) are both centered relative to the box body (1) to ensure uniform force distribution on the tray (2).

It should be noted that the directional terms "above" and "below" mentioned in this application are based on the directional references in the accompanying drawings. The setting of two openings at different heights allows the tray (2) to be in different inclined states sequentially, facilitating the rolling and flipping of cryogenic tubes.

Furthermore, due to the evaporation of liquid nitrogen, the liquid level decreases, increasing the distance between it and the cryogenic tubes, resulting in a slower cooling rate and weakened cooling effect. In the conventional aluminum frame clamping method, it is difficult to synchronize the descent of cryogenic tubes with the lowering liquid nitrogen level as they usually require the labor-intensive process of adding more liquid nitrogen to the box. However, in the low-temperature semen freezing and storage device proposed in this utility model, as the liquid nitrogen level drops, the inclined limiting plate (13) can move the tray (2) downward step by step, ensuring that the tray (2) matches the descending liquid nitrogen level, thereby ensuring an effective pre-cooling effect on the cryogenic tubes.

Figure 4:
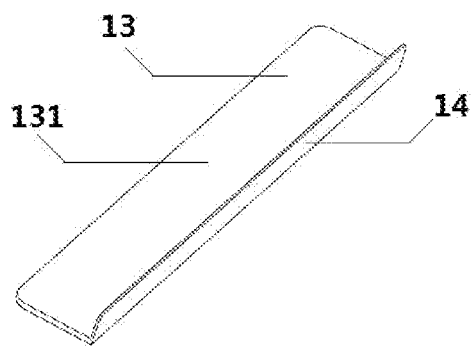
FIG. 4 is a schematic structural diagram of the limit plate in the embodiment of the invention.
Figure 5:
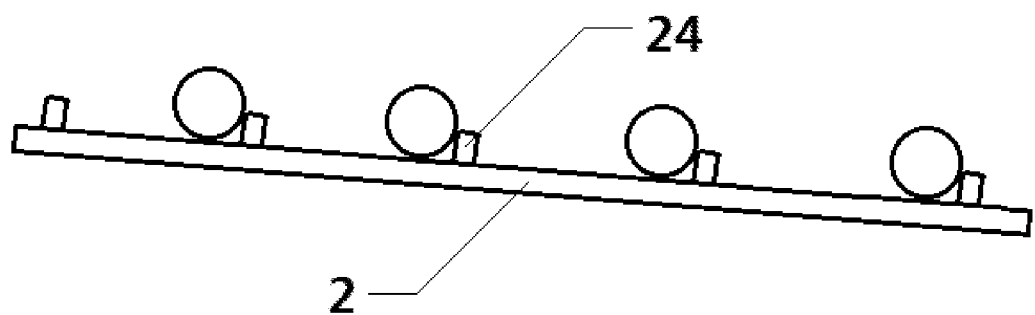
FIG. 5 is a schematic diagram of the tray and the freezing tube in an inclined state in the embodiment of the invention.
Figure 6:
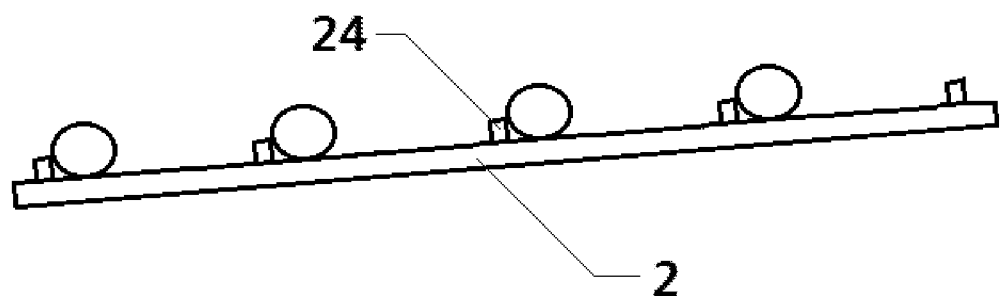
FIG. 6 is a schematic diagram of the tray and the freezing tube in an inclined state in the embodiment of the utility mode wherein, 11. Marking line; 121. First opening; 122. Second opening; 13. Limiting plate; 131. Horizontal end; 14. Vertical end; 2. Tray; 21. Hinge end; 22. Protective flange; 23. Silver wire; 24. Limiting part; 3. Cover.

In some embodiments, as shown in FIG. 4, the limiting plate (13) is constructed in an "L" shape. The horizontal end (131) of the limiting plate (13) is used to insert into the opening and overlap with the tray (2), while the vertical end (14) of the limiting plate (13) prevents excessive insertion and allows easy manual operation for insertion and removal by the operators.

Furthermore, in some embodiments, both the first opening (121) and the second opening (122) have a limiting plate (13). These limiting plates (13) can be distinguished by different colors for convenience, allowing the operators to adjust them more easily.

The following provides a reference for a low-temperature semen freezing and storage device with specific parameters. It should be noted that these specific parameters can be adjusted flexibly based on the specifications and dimensions of the cryogenic tubes and the actual usage space.

In some embodiments, the main body of the low-temperature semen cryopreservation device is a rigid foam box with dimensions of 20 cm in length, 15 cm in width, 10 cm in height, and 0.5 cm in thickness. The interior walls and bottom of the foam box are coated with low thermal conductivity material polyurethane, which helps to slow down the evaporation of liquid nitrogen and effectively conserve the usage of liquid nitrogen. Additionally, the inside of the box is equipped with a liquid nitrogen level height marking line 11 to assist the personnel in accurately controlling the relative distance between the liquid nitrogen level and the cryogenic tubes.

The tray 2 is made of high thermal conductivity material silver, with one side of the tray being pivotally and movably connected to the inner side wall of the box 1. The pivot point 21 of the tray is positioned 8 cm above the bottom of the box 1. The other three sides of the tray 2 do not make contact with the inner walls of the box 1, and they have vertical, upward-facing protective flanges 22 that are 0.5 cm high and 0.1 cm thick. The tray 2 as a whole measures 18 cm in length and 14 cm in width and is constructed from interwoven silver wires 23. The spacing between adjacent silver wires 23 is 0.5 cm, and the diameter of the silver wires 23 is 0.2 cm.

In addition, on the tray 2, there are three sets of parallel silver limiting parts 24, totaling 15, which can simultaneously restrict the position rolling of 12 cryogenic tubes. Each limiting part 24 has a length of 5 cm, a width of 0.2 cm, and a height of 0.5 cm. The spacing between the left and right of each limiting part 24 is equal and is 0.75 cm, while the front and rear spacing is equal and is 3.1 cm (for cryogenic tubes with a typical diameter d of 1.2 cm, the spacing L between the front and rear ends after rolling is approximately $L=1/2\pi d + d \approx 3.1$ cm). On the opposite inner wall of the tray's pivot end 21, there are flat first opening 121 and second opening 122, each centrally positioned. Each opening measures 8 cm in length and 0.3 cm in width. The first opening 121 is located 9 cm above the box's bottom, while the second opening 122 is located 7 cm above the box's bottom.

In the described configuration of the low-temperature semen cryopreservation device, the following usage process is exemplary:

Firstly, lift the tray 2 upwards and introduce liquid nitrogen into the box 1. Observe the marking line 11 until the liquid nitrogen level is at approximately 3 cm, maintaining a distance of about 5 cm between the liquid nitrogen level and the tray 2 in its horizontal position. Next, insert the previously mentioned limiting plates 13 into the first opening 121 and second opening 122 of the box 1, and then lower the tray 2. The tray 2 initially supports and engages with the limiting plate 13 in the first opening 121, and the cryogenic tubes, containing semen mixed with cryoprotectant, are placed horizontally between adjacent pairs of limiting parts 24 on the tray 2, accommodating up to 12 semen cryogenic tubes as needed.

After these steps, due to the higher height of the first opening 121 compared to the pivot end 21, the tray 2 is inclined with the pivot end 21 lower and the limiting plate 13 end higher. All the cryogenic tubes are supported by and engage with the limiting parts 24 near the pivot end 21 due to gravity. The cover 3 is then placed, and the cryogenic tubes are exposed to liquid nitrogen vapor for 5 minutes.

After 5 minutes of vapor exposure, the limiting plate 13 from the first opening 121 is removed, and the tray 2 rotates downward to engage and support with the limiting plate 13 in the second opening 122. At this point, due to the lower height of the second opening 122 compared to the pivot end 21, the tray 2 is inclined with the pivot end 21 higher and the limiting plate 13 end lower. All the cryogenic tubes are influenced by gravity and begin to rotate until they reach the limiting parts 24 on the side closer to the limiting plate 13, causing the cryogenic tubes to flip over. The cover 3 is placed back on, and the tubes continue to be exposed to vapor for another 5 minutes.

After 5 minutes of vapor exposure, the limiting plate 13 corresponding to the second opening 122 is removed, and the tray 2 continues to rotate downward until it falls into the liquid nitrogen. At this point, the cover 3 is opened, and all the cryogenic tubes are pushed below the liquid nitrogen level within the box 1. The box 1 is then transferred to a liquid nitrogen storage tank to complete the freezing process.

It should be understood that while terms like "first," "second," and so on may be used here to describe various units, these units should not be limited by such terminology. The use of these terms is merely for distinguishing one unit from another. For example, within the scope of exemplary embodiments, the first unit may be referred to as the second unit, and similarly, the second unit may be referred to as the first unit.

In this specification, directional terms such as "outer," "middle," "inner," and the like, are defined with respect to the structures shown in the accompanying drawings. They are relative concepts and may vary accordingly based on their different positions and usage conditions. Therefore, these or other directional terms should not be interpreted as limiting.

The above description represents preferred embodiments of the present application and is not intended to limit the application in any form or substance. It should be noted that those skilled in the art can make various improvements and additions without departing from the scope of the application, provided that they do not deviate from the methods described herein. Such improvements and additions should also be considered within the scope of protection of this utility model.

Furthermore, those skilled in the art, within the spirit and scope of this application, can make equivalent changes, modifications, and variations to the above-disclosed technical content. Any changes, modifications, and variations that are made based on the substantive technology of this application remain within the scope of the technical solution of this application.

What is claimed is:

1. A low-temperature semen cryopreservation device, used for placing cryopreservation tubes and performing a freezing process on the cryopreservation tubes, comprising: a box body (1) for containing low-temperature cryoprotectant fluid; a tray (2), one side end of which is pivotally connected to an inner side wall of the box body (1); the tray (2) is used to hold the cryopreservation tubes, and the tray (2) has a limiting portion (24) for limiting the movement of the cryopreservation tubes; two openings are arranged in sequence along a height direction of the box body (1) on one side of the box body (1) relative to a hinge end (21), with a height of one of the openings higher than that of the hinge end (21), and a height of the other opening lower than that of the hinge end (21); a limiting plate (13) detachably inserted into either of the openings; when the limiting plate (13) is inserted into either of the openings, the limiting portion (24) is engage with one side of the tray (2) relative to the hinge end (21); when the limiting plate (13) is switched from one opening to the other, the tray (2) tilts, thereby driving the cryopreservation tubes to rotate until the cryopreservation tubes abut against the limiting portion (24).

2. The low-temperature semen cryopreservation device as claimed in claim 1, wherein the tray (2) is in a grid pattern.

3. The low-temperature semen cryopreservation device as claimed in claim 1, wherein there are markings (11) on the box body (1) for observing a liquid level of the low-temperature cryoprotectant fluid.

4. The low-temperature semen cryopreservation device as claimed in claim 1, wherein there are multiple limiting portions (24) arranged in an array on the tray (2), and each of the cryopreservation tubes is placed between adjacent limiting portions (24).

5. The low-temperature semen cryopreservation device as claimed in claim 1, characterized in that the limiting portions (24) are strip-shaped protrusions located on the tray (2).

6. The low-temperature semen cryopreservation device as claimed in claim 4, wherein a spacing between the adjacent limiting portions (24) is equal to an outer diameter of the cryopreservation tube plus half of a circumference of the cryopreservation tube.

7. The low-temperature semen cryopreservation device as claimed in claim 1, wherein the limiting plate (13) is shaped like a letter "L".

8. The low-temperature semen cryopreservation device as claimed in claim 1, wherein the limiting plate (13) has two portions that correspond to the two openings.

9. The low-temperature semen cryopreservation device as claimed in claim 1, further including a cover body (3) forming a closed cavity with the box body (1).

10. The low-temperature semen cryopreservation device as claimed in claim 1, wherein the inner side wall and a bottom end face of the box body (1) are covered with a low thermal conductivity material.

* * * * *